United States Patent
Fu et al.

(10) Patent No.: US 6,994,737 B2
(45) Date of Patent: Feb. 7, 2006

(54) HIGH-CAPACITY POLYMERIC LI-ION CELL AND ITS PRODUCTION METHOD

(75) Inventors: Zhiguo Fu, Shuangcheng (CN); Chunsheng Wang, Shuangcheng (CN); Guopeng Gao, Shuangcheng (CN); Hongjun Si, Shuangcheng (CN); Yanmei Mu, Shuangcheng (CN)

(73) Assignee: Hei Long Jiang Zhong Qiang Power-Tech Co., Ltd., Shuangcheng (CN)

( * ) Notice: Subject to any disclaimer, the term of this patent is extended or adjusted under 35 U.S.C. 154(b) by 0 days.

(21) Appl. No.: 10/861,661

(22) Filed: Jun. 4, 2004

(65) Prior Publication Data

US 2005/0022370 A1    Feb. 3, 2005

(30) Foreign Application Priority Data

Jul. 30, 2003   (CN) .............................. 03149865 A

(51) Int. Cl.
*H01M 4/52*  (2006.01)
*H01M 4/66*  (2006.01)
*H01M 10/04* (2006.01)

(52) U.S. Cl. .................... 29/623.5; 29/623.1; 429/236; 429/245; 429/231.3

(58) Field of Classification Search ............... 429/236, 429/245, 162, 316; 29/623.1–623.5
See application file for complete search history.

(56) References Cited

U.S. PATENT DOCUMENTS

| | | | | |
|---|---|---|---|---|
| 5,584,893 A | * | 12/1996 | Mitchell | 29/623.5 |
| 5,670,273 A | * | 9/1997 | Velasquez et al. | 429/162 |
| 5,690,703 A | * | 11/1997 | Mitchell et al. | 29/623.5 |
| 5,698,147 A | * | 12/1997 | Chern et al. | 264/104 |
| 5,759,215 A | * | 6/1998 | Masuda | 29/623.2 |
| 5,772,702 A | * | 6/1998 | Barker et al. | 29/623.1 |
| 5,961,671 A | * | 10/1999 | Guindy et al. | 29/623.1 |
| 5,962,170 A | * | 10/1999 | Mitchell | 429/316 |

FOREIGN PATENT DOCUMENTS

| | | |
|---|---|---|
| CN | 1186355 A | 7/1998 |
| CN | 1426126 A | 6/2003 |
| CN | 1435903 A | 8/2003 |

* cited by examiner

*Primary Examiner*—Mark Ruthkosky
(74) *Attorney, Agent, or Firm*—Kathleen M. Williams; Palmer & Dodge LLP

(57) ABSTRACT

This invention is related to a process for preparing polymeric Li-ion cell with high-capacity as well as the cells manufactured with the process. The process produces anode paste with lithium salt and cobalt oxide and sprays the paste onto aluminum current collector to form the anode; produces cathode paste with two lithium-embedded carbon materials and sprays the paste to copper current collector to form the cathode; produces a paste with polyvinylidene fluoride, silicon dioxide (gas phase), o-dibutyl phthalate ester, and acetone and sprays the paste onto a polyester film to form the diaphragm; performs extraction for the cell assembled with said anode, diaphragm, and cathode, welds lugs, immerses the cell into electrolyte to, and packs the cell with aluminum-plastic composite film, and finally performs formation for the cell, so that a polymeric Li-ion cell with high-capacity is accomplished. Owing that this invention employs special electrode paste composition and special manufacturing technique, the charging/discharging performance of the cell is enhanced, and the cell is more suitable for power supply. The thickness of the cell can be controlled within 3 mm; thus the cell is especially ideal for power supply of electric vehicles.

9 Claims, No Drawings

HIGH-CAPACITY POLYMERIC LI-ION CELL AND ITS PRODUCTION METHOD

RELATED APPLICATIONS

This application claims priority under 35 U.S.C. § 119 to Chinese Application No. 03149865.5 filed Jul. 30, 2003, the entirety of which is incorporated herein by reference.

TECHNICAL FIELD

This invention is related to electrochemical field, in particular a polymeric Li-ion cell with high-capacity and a process for its preparation.

BACKGROUND ART

Chemical electric sources with high-capacity are mainly used in power-application field and mostly refer to lead-acid cells, Ni—H cells, and Li-ion cells. Presently, the main defects of chemical cells with high-capacity are low in energy density, poor in quality, and large in size, which bring inconvenience to their uses.

SUMMARY OF THE INVENTION

The purpose of this invention is to provide a compact cell with high energy. Another purpose of this invention is to provide a process for preparing such cells.

The process for preparing polymeric Li-ion cell with high-capacity described in this invention comprises the steps of:

1. Preparation of Anode (1) Preparation of Anode Paste

The anode of the polymeric Li-ion cell with high-capacity described in this invention employs lithium salt and cobalt oxide, which are mixed together and then thoroughly mixed with polyvinylidene fluoride (PVDF), conductive carbon black, and o-dibutyl phthalate ester and dissolved in acetone into a paste; the weight ratios are as follows:

| | |
   |---|---|
   | Mixture of lithium salt and cobalt oxide: | 60%–70% |
   | Polyvinylidene fluoride (PVDF): | 5%–10% |
   | Conductive carbon black: | 8%–15% |
   | O-dibutyl phthalate ester: | 12%–20% |

(2) Preprocessing of Current Collector

The current collector-preprocessing paste made of mixture of EAA, conductive carbon black, and acetone is coated evenly onto an aluminum current collector to enhance cohesive force to the anode material and reduce internal resistance of the cell.

(3) Final Preparation of Anode

The anode paste is coated evenly on the aluminum current collector; then, the coated anode is pressed on a flat-press machine into finished anode under certain temperature and pressure.

2. Preparation of Cathode (1) Preparation of Cathode Paste

The cathode of the polymeric-Li-ion cell with high-capacity described in this invention employs two lithium-embedded carbon materials, which are thoroughly mixed with polyvinylidene fluoride (PVDF), conductive carbon black, and o-dibutyl phthalate ester and then dissolved in acetone into paste. The weight ratios are as follows:

| | |
   |---|---|
   | Lithium-embedded carbon materials: | 60%–70% |
   | Polyvinylidene fluoride (PVDF): | 6%–15% |
   | Conductive carbon black: | 9%–15% |
   | O-dibutyl phthalate ester: | 18%–25% |

(2) Preparation of Cathode

The cathode paste is coated evenly onto a copper current collector processed in the same way, and then the coated cathode is pressed into finished cathode on a flat-press machine under certain temperature and pressure.

3. Preparation of Diaphragm

The diaphragm of the high-capacity Li-ion cell described in this invention is a polyvinylidene fluoride (PVDF) diaphragm, i.e., polyvinylidene fluoride (PVDF), silicon dioxide (gas phase), o-dibutyl phthalate ester, and acetone are mixed together into a paste, then the paste is coated onto a polyester film, which is dried and torn off (thickness <0.03 mm); the weight ratios are as follows:

| | |
   |---|---|
   | Polyvinylidene fluoride (PVDF): | 40%–65% |
   | Silicon dioxide (gas phase): | 4%–10% |
   | O-dibutyl phthalate ester: | 25%–45% |

4. Manufacturing Cell

An anode, a diaphragm, and a cathode are laminated and pressed on a flat-press machine to produce the cell (thickness ≤3mm);

5. Removing of Plasticizer

The cell described in procedure 4 is extracted with absolute methanol for 3 times and then dried;

6. Welding of Current Collector

The copper current collector and the aluminum current collector are welded with nickel lugs as the two poles of the cell;

7. Immersing in Electrolyte

The cell described in procedure 6 is dipped in electrolyte;

8. Packing the Cell

The cell is packed with an aluminum-plastic composite film;

9. Formation of the Cell

Initial charging/discharging test is carried out for the cell processed in procedure 8 according to the appropriate formation mechanism.

The cells described above may be connected in tandem or in shunt into practical high-capacity batteries.

This invention also provides polymeric Li-ion cell with high-capacity produced with the process described above.

Owing that this invention employs special electrode paste composition and special manufacturing technique, the charging/discharging performance of the cell is enhanced, thus the cell is more suitable for power supply use. The thickness of the cell can be controlled within 3 mm, and the size of a battery assembled with such cells is only 1/7 of a lead-acid battery of the same capacity or 1/4 of a Ni—H battery; the weight of such a battery is only 1/3 of the lead-acid battery or 1/2 of the Ni—H battery. Such batteries can be used in a wide range of fields, especially ideal for power supply of electric vehicles.

DETAILED DESCRIPTION OF THE INVENTION

The invention is described in detail with the embodiments hereunder.

Embodiment 1:

1. Preparation of Anode Materials
   (1) Preparation of Anode Paste

| | |
|---|---|
| $LiMn_2O_4$ | 182 g |
| $Co_2O_3$ | 49 g |
| PVDF | 42 g |
| O-dibutyl phthalate ester | 50 g |
| Conductive carbon black | 140 g |
| Acetone | 4340 g |

Above materials are agitated homogeneously in an agitator into paste at 6000 r/min agitating speed for 120 minutes.

(2) Preparation of Current Collector-Preprocessing Paste

| | |
|---|---|
| Conductive carbon black | 45.5 g |
| EAA | 14 g |
| Acetone | 560 g |

Above materials are agitated homogeneously in an agitator into paste at 6000 r/min agitating speed for 30 minutes. Then the paste is sprayed onto the current collector with a screen sprayer.

(3) Final Preparation of Anode

The prepared anode paste is loaded into a spray coater and then sprayed to the current collector evenly under the conditions of 3 atm of spraying pressure, 0.4 m of spraying clearance, and 0.017 mm of spraying aperture; then the current collector is dried for 30 minutes at 55° C. in a dryer.

The dried anode is pressed on a flat-press machine at 100° C. hot pressing temperature and then cut into 100×180 mm rectangular sheets.

2. Preparation of Cathode Materials
   (1) Preparation of Cathode Paste:

| | |
|---|---|
| MCMB | 84 g |
| Graphite | 70 g |
| PVDF | 20 g |
| O-dibutyl phthalate ester | 42 g |
| Conductive carbon black | 70 g |
| Acetone | 4270 g |

Above materials are agitated homogeneously in an agitator into paste at 5500 r/min agitating speed for 100 minutes.

(2) Preparation of Current Collector-Preprocessing Paste

| | |
|---|---|
| Conductive carbon black | 45.5 g |
| (EAA) | 28 g |
| Acetone | 210 g |

Above materials are agitated homogeneously in an agitator into paste at 6000 r/min agitating speed for 30 minutes. Then the paste is sprayed onto the current collector with a screen sprayer.

(3) Final Preparation of Cathode

The prepared cathode paste is loaded into a spray coater and then sprayed to the current collector evenly under the conditions of 3 atm spraying pressure, 0.4 m of spraying clearance, and 0.015 mm of spraying aperture; then the current collector is dried for 15 minutes at 55° C. in a dryer.

The dried cathode is pressed on a flat-press machine at 100° C. hot pressing temperature and then cut into 100×180 mm rectangular sheets.

3. Preparation of Diaphragm Material

| | |
|---|---|
| PVDF | 175 g |
| Silicon dioxide (gas phase) | 57 g |
| O-dibutyl phthalate ester | 35 g |
| Acetone | 2450 g |

Above materials are mixed homogeneously in an agitator at 8000 r/min agitating speed for 60 minutes; then the mixture is spread on a spreader at 0.01 mm spreading clearance to 0.005 mm final spreading thickness.

4. Synthesis of Single Cell

The anode, cathode, and diaphragm manufactured as above are laminated and then sealed on a hot press at 110° C. heat-seal temperature to 2.65 m thickness.

5. Extraction

The sealed cell is immersed in methanol to abstract the plasticizer in the cell for 3 times (30 minutes each time) under agitation with a magnetic stirrer; then the cell is dried for 45 minutes at 50° C. in an oven.

6. Welding of Lugs

The anode and cathode current collectors are welded with nickel and aluminum bar to form two lead-outs of the cell.

7. Immersing in Electrolyte and Packing of the Cell

The cell is immersed in 1M LiPF6 electrolyte solution of ethylene carbonate and diethyl carbonate (1:1) for 20 minutes, then the excessive electrolyte is removed, and then cell is packed with aluminum-plastic composite film.

8. Formation of the Cell

Formation is carried out for the cell according to 0.5C discharging mechanism. The test result is as follows:

Initial discharging capacity: 15 Ah, discharging capacity after 500 0.5C cycles: 14 Ah 9. Assembly of Battery The above said eight cells are connected in shunt into a 120 Ah battery; then, according to the practical demand of the electric vehicle, 88 batteries are connected in shunt to constitute the battery for electric vehicle.

Embodiment 2:

1. Preparation of Anode Materials
   (1) Preparation of Anode Paste

| | |
|---|---|
| $LiNiO_2$ | 190 g |
| $Co_3O_4$ | 45 g |
| PVDF | 42 g |
| O-dibutyl phthalate ester | 50 g |

-continued

| | |
|---|---|
| Conductive carbon black | 140 g |
| Acetone | 4300 g |

Above materials are agitated homogeneously in an agitator into paste at 6000 r/min agitating speed for 120 minutes.

(2) Preparation of Current Collector-Preprocessing Paste

| | |
|---|---|
| Conductive carbon black | 45.5 g |
| EAA | 14 g |
| Acetone | 560 g |

The above materials are agitated homogeneously in an agitator into paste with speed of 6000 r/min for 30 minutes. Then the paste is sprayed onto the current collector with a screen sprayer.

(3) Final Preparation of Anode

The prepared anode paste is loaded into a spray coater and then sprayed to the current collector evenly under the conditions of 3 atm of spraying pressure, 0.4 m of spraying clearance, and 0.017 mm of spraying aperture; then the current collector is dried for 30 minutes at 55° C. in a dryer.

The dried anode is pressed on a flat-press machine at 100° C. hot pressing temperature and then cut into 100×180 mm rectangular sheets.

2. Preparation of Cathode Materials (1) Preparation of Cathode Paste:

| | |
|---|---|
| MCMB | 75 g |
| Graphite | 75 g |
| PVDF | 20 g |
| O-dibutyl phthalate ester | 42 g |
| Conductive carbon black | 70 g |
| Acetone | 4270 g |

Above materials are agitated homogeneously in an agitator into paste at 5500 r/min agitating speed for 100 minutes.

(2) Preparation of Current Collector-Preprocessing Paste

| | |
|---|---|
| Conductive carbon black | 45.5 g |
| EAA | 28 g |
| Acetone | 210 g |

Above materials are agitated homogeneously in an agitator into paste at 6000 r/min agitating speed for 30 minutes. Then the paste is sprayed onto the current collector with a screen sprayer.

(3) Final Preparation of Cathode

The prepared cathode paste is loaded into a spray coater and then sprayed to the current collector evenly under the conditions of 3 atm of spraying pressure, 0.4 m of spraying clearance, and 0.015 mm of spraying aperture; then the current collector is dried for 15 minutes at 55° C. in a dryer.

The dried cathode is pressed on a flat-press machine at 100° C. hot pressing temperature and then cut into 100×180 mm rectangular sheets.

3. Preparation of Diaphragm Material

| | |
|---|---|
| PVDF | 175 g |
| Silicon dioxide (gas phase) | 57 g |
| O-dibutyl phthalate ester | 35 g |
| Acetone | 2450 g |

Above materials are mixed homogeneously in an agitator at 8000 r/min agitating speed for 60 minutes; then the mixture is spread on a spreader at 0.01 mm spreading clearance to 0.005 mm final spreading thickness.

4. Sealing Cell Components

The anode, cathode, and diaphragm manufactured said above are laminated and then sealed on a hot press at 110° C. heat-seal temperature to 2.7 m thickness.

5. Extraction

The sealed cell is immersed in methanol to abstract the plasticizer in the cell for 3 times (30 minutes each time) under agitation with a magnetic stirrer; then the cell is dried for 45 minutes at 50° C. in an oven.

6. Welding of Lugs

The anode and cathode current collectors are welded with nickel bar and aluminum bar to form two lead-outs of the cell.

7. Dipping in Electrolyte and Packing

The cell is immersed in 1M LiPF6 electrolyte solution of ethylene carbonate and diethyl carbonate (1:1) for 20 minutes, then the excessive electrolyte is removed, and then cell is packed with aluminum-plastic composite film.

8. Formation of the Cell

Formation is carried out for the cell according to 0.5C discharging mechanism. The test result is as follows:

Initial discharging capacity: 15 Ah, discharging capacity after 500 0.5C cycles: 14.3 Ah 9. Assembly of Battery Above eight cells are connected in shunt into a 120 Ah battery; then, according to the practical demand of the electric vehicle, 88 batteries are connected in shunt to constitute the battery for electric vehicle.

The invention claimed is:

1. A process for preparing polymeric Li-ion cell with high-capacity, comprising the steps of:

(1) preparing the anode comprising the steps of:

(a) preparing an anode paste using acetone as a solvent, said paste comprising a mixture of materials in the following weight ratios:

| | |
|---|---|
| Mixture adulterated with lithium salt and cobalt oxide: | 60%–70% |
| Polyvinylidene fluoride (PVDF): | 5%–10% |
| Conductive carbon black: | 8%–15% |
| O-dibutyl phthalate ester: | 12%–20% |

(b) mixing ethylene-acrylate copolymer (EAA), conductive carbon black, and acetone to form a aluminum current collector preprocessing paste;

(c) coating said current collector preprocessing paste onto the aluminum current collector evenly to preprocess the aluminum current collector;

(d) coating said aluminum current collector with said anode paste to generate a coated anode;

(e) pressing said coated anode into a finished anode on a flat-press machine under certain temperature and pressure;
(2) preparing the cathode comprising the steps of:
  (a) preparing an cathode paste using acetone as a solvent, said paste comprising a mixture of materials in the following weight ratios:

| | |
|---|---|
| Lithium-embedded carbon materials: | 60%–70% |
| Polyvinylidene fluoride (PVDF): | 6%–15% |
| Conductive carbon black: | 9%–15% |
| O-dibutyl phthalate ester: | 18%–25% |

(b) mixing EAA, conductive carbon black, and acetone to form a copper current collector preprocessing paste;
  (c) coating a copper current collector evenly with said copper current collector preprocessing paste to form a treated copper current collector;
  (d) coating evenly said treated copper current collector with said cathode paste to form a coated cathode;
  (e) pressing said coated cathode into a finished cathode on a flat-press machine under certain temperature and pressure;
(3) preparing a diaphragm comprising the steps of:
  (a) mixing with acetone the following materials according to the following weight ratios to form a paste

| | |
|---|---|
| Polyvinylidene fluoride (PVDF): | 40%–65% |
| Silicon dioxide with gas phase: | 4%–10% |
| O-dibutyl phthalate ester: | 25%–45% |

(b) spraying said paste onto a polyester film to form said diaphragm;
(4) preparing a single cell comprising the steps of:
  (a) laminating said anode, diaphragm, and cathode;
  (b) heat pressing said laminated anode, diaphragm, and cathode on a flat-press machine to produce said single cell;
(5) removing of plasticizer comprising the step of:
  (a) extracted said single cell with absolute methanol for 3 times;
  (b) drying said single cell;
(6) welding a current collector comprising the steps of:
  (a) welding said copper current collector and the aluminum current collector with nickel lugs together with an ultrasonic welding machine to form two electrodes of the cell;
(7) immersing said single cell in an electrolyte solution;
(8) packing said single cell with aluminum-plastic composite film and then formation is carried out for it.

2. The process for preparing polymeric Li-ion cell with high-capacity according to claim 1, wherein the lithium salt in said mixture of lithium salt and cobalt oxide means lithium manganate or nickel lithium, the weight ratio of which in the mixture is 80~90%; the cobalt oxide means cobalt trivalent oxide or cobaltosic oxide, the weight ratio of which is 10~20%.

3. The process for preparing polymeric Li-ion cell with high-capacity according to claim 1, wherein said lithium-embedded carbon material means MCMB, graphite, or mixture of them.

4. The process for preparing polymeric Li-ion cell with high-capacity according to claim 1, wherein said electrolyte means organic solution of LiPF6 and lithium perchlorate; said solvent is mixed solvent of carbonic ethyl ester, carbonic allyl ester, dimethyl carbonate, and divinyl carbonate.

5. The process for preparing polymeric Li-ion cell with high-capacity according to claim 1, wherein said process of coating anode paste onto aluminum current collector means spray anode material to aluminum current collector directly.

6. The process for preparing polymeric Li-ion cell with high-capacity according to claim 1, wherein said process of coating cathode paste onto copper current collector means spray cathode material onto copper current collector directly.

7. The process for preparing polymeric Li-ion cell with high-capacity according to claim 1, wherein the thickness of the anode of said cell after pressing is controlled within 0.14 mm.

8. The process for preparing polymeric Li-ion cell with high-capacity according to claim 1, wherein the thickness of the cathode of said cell after pressing is controlled within 0.15 mm.

9. The process for preparing polymeric Li-ion cell with high-capacity according to claim 1, wherein the diaphragm of said unit is a porous polymer comprising PVDF, silicon dioxide of gas phase, o-dibutyl phthalate ester, and its thickness is controlled within 0.03 mm.

* * * * *